Nov. 5, 1929.   W. H. THOMPSON   1,734,408
CULTIVATOR
Filed April 30, 1928
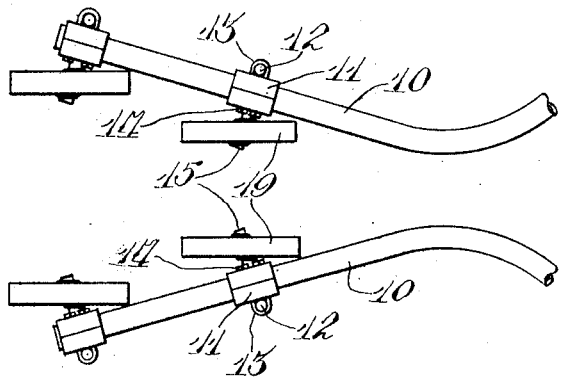
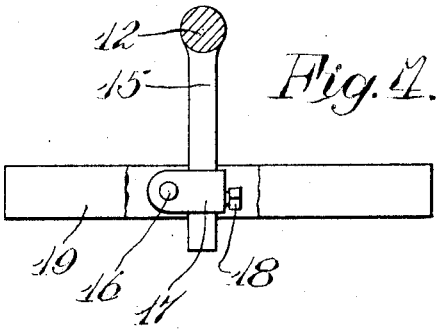
Fig. 1.
Fig. 4.
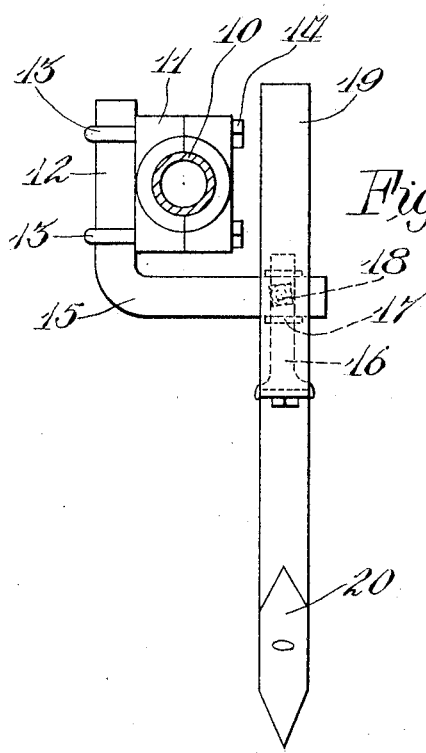
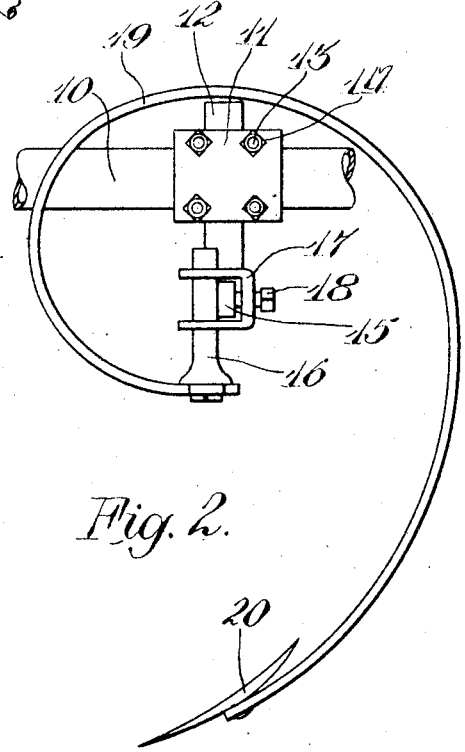
Fig. 3.
Fig. 2.
Inventor
William H. Thompson
By ___
Atty.

Patented Nov. 5, 1929

1,734,408

UNITED STATES PATENT OFFICE

WILLIAM H. THOMPSON, OF CHICAGO, ILLINOIS, ASSIGNOR TO INTERNATIONAL HARVESTER COMPANY, A CORPORATION OF NEW JERSEY

CULTIVATOR

Application filed April 30, 1928. Serial No. 273,780.

The present invention relates to cultivators, and more particularly to an improved mounting for use in securing cultivator teeth of various types to the beams of straddle row cultivators, or similar implements.

The main object of the invention is to provide a mounting that will permit a cultivator tooth to be mounted at either side of its supporting beam, so that different adjustments of individual teeth and different lateral spacings between sets of teeth on adjacent beams of a straddle row cultivator can be readily obtained. A further object is to provide a mounting in which lateral adjustment of the soil working unit carried thereby is effected through rotative adjustment of a supporting standard about its vertical axis.

The foregoing and other minor objects and advantages are attained by the combination and details of construction hereinafter more specifically described and illustrated in the accompanying drawing, where—

Figure 1 is a plan view showing a pair of straddle row cultivator beams with the novel tooth mountings in position thereon;

Figure 2 is a side view on an enlarged scale showing one of the mountings in position on a beam;

Figure 3 is a front view of the structure shown in Figure 2; and

Figure 4 is a detail plan view of a portion of a standard with a cultivator tooth secured thereto.

In the present instance, the invention is illustrated as in combination with a pair of substantially horizontal trailing cultivator beams 10 (Figure 1) arranged in straddle row relation and supported at the forward ends on a tractor or vehicle (not shown). At a plurality of transversely aligned points on the beams there are mounted clamp blocks 11, which serve to provide flat or plane side faces in instances where pipe beams such as herein illustrated are used. To one side face of each clamp block 11 there is clamped the vertical arm or portion 12 of a standard composed of angularly related arms 12 and 15. The clamping means preferably consists of U-bolts 13 passing through suitable apertures in the blocks and drawn up on the standard 12 by nuts 14 engaging the opposite face of the block. The U-bolts 13 incidentally serve to clamp the two halves of the block 11 to the beam 10. The angular standard has the horizontally extending arm 15 extended on a line transverse to the axis of the beam 10 and preferably passing under said beam. On the end of the horizontal arm or portion 15 of the angular standard there is secured a short upright tooth-carrying bar 16, as by means of a U-clamp 17, the arms of the clamp have openings to engage the bar and the standard 15 extends between the arms. A set-screw 18 in the base of clamp 17 serves to clamp the parts together, as illustrated in Figure 2. On the lower end of the tooth-carrying bar 16 there is secured in any suitable manner the upper end portion of a spring bar 19, which curves upwardly and rearwardly and surrounds the horizontal portion 15 of the standard, terminating at a point beneath said standard where a tooth or shovel 20 is secured to the ground engaging end of the spring bar. Obviously, the bar 16 may carry soil working elements of other types.

It will be observed that the combination above described exemplifies a construction in which the angular standard comprising the arms 12 and 15 is so supported with relation to a cultivator beam 10 that it may be turned about the vertical axis of the arm 12, when the clamp bolts 13 are loosened, thereby permitting the horizontal arm 15 of the standard to be extended inwardly under the beams, as shown in Figure 1, or outwardly therefrom. This adjustment permits the soil working elements to be mounted either inside or outside of the cultivator beams, and therefore, affords a wide range of location and lateral spacing of the teeth carried by the beams to meet varying requirements of different crops and different times of cultivation. Also, it will be noted that the tooth-carrying bars are secured on the horizontal portions of the standards by readily reversible means which are laterally adjustable on the horizontal arms 15 of the standards.

While the above description discloses a preferred embodiment of the invention, various modifications thereof are possible without departure from the scope of the invention as defined in the following claims.

What is claimed is:

1. In a cultivator tooth mounting, the combination of a substantially horizontal cultivator beam, an angular standard having a vertically disposed arm clamped to one side of the cultivator beam and a horizontally disposed arm extending on a line at right angles to the cultivator beam, an upright bar clamped on the end of the horizontal arm, and a curved spring cultivator tooth secured to the bar and surrounding the horizontal arm of the standard.

2. A spring tooth cultivator comprising the combination of a pair of beams, angular standards having vertical arms disposed in transverse alignment and clamped to one side of the respective beams by means affording rotative adjustment of the standards on their vertical axes, horizontal arms on the lower ends of the standards adapted to extend either inwardly or outwardly of the respective beams through said rotative adjustment, and tooth-carrying members clamped on the horizontal arms by reversible clamping means.

In testimony whereof I affix my signature.

WILLIAM H. THOMPSON.